US009860921B2

United States Patent
Kim et al.

(10) Patent No.: US 9,860,921 B2
(45) Date of Patent: Jan. 2, 2018

(54) METHOD AND APPARATUS FOR TRANSMITTING AND RECEIVING DATA BASED ON AGGRESSIVE SPATIAL REUSE

(71) Applicant: Electronics and Telecommunications Research Institute, Daejeon (KR)

(72) Inventors: Jin Kyeong Kim, Daejeon (KR); Sung Geun Jin, Daejeon (KR)

(73) Assignee: ELECTRONICS AND TELECOMMUNICATIONS RESEARCH INSTITUTE, Seoul (KR)

( * ) Notice: Subject to any disclaimer, the term of this patent is extended or adjusted under 35 U.S.C. 154(b) by 165 days.

(21) Appl. No.: 14/618,932

(22) Filed: Feb. 10, 2015

(65) Prior Publication Data

US 2015/0351128 A1 Dec. 3, 2015

(30) Foreign Application Priority Data

May 30, 2014 (KR) .................. 10-2014-0066090
Jun. 13, 2014 (KR) .................. 10-2014-0072035

(51) Int. Cl.
*H04W 74/08* (2009.01)
*H04W 72/04* (2009.01)

(52) U.S. Cl.
CPC ...... *H04W 74/085* (2013.01); *H04W 72/0446* (2013.01)

(58) Field of Classification Search
CPC .................. H04W 74/085; H04W 72/0446
See application file for complete search history.

(56) References Cited

U.S. PATENT DOCUMENTS 8,780,803 B2    7/2014 Hong et al.
2006/0114867 A1*  6/2006 Du ............... H04W 74/002
                                                 370/338

(Continued)

FOREIGN PATENT DOCUMENTS

KR    10-2012-0035099 A    4/2012

OTHER PUBLICATIONS

Mogre el al. ("Incorporating Spatial Reuse into Algorithms for Bandwidth Management and Scheduling in IEEE 802.16j Relay Networks", 2009 IEEE 34th Conference on Local Computer Networks (LCN 2009) Zürich, Switzerland; Oct. 20-23, 2009).*

(Continued)

*Primary Examiner* — Jamal Javaid
*Assistant Examiner* — Saad Khawar

(57) ABSTRACT

A method and apparatus for transmitting and receiving mobile data based on an ASR is provided. The mobile data transmission method of a first mobile terminal including transmitting a dRTS frame and creating an ASR list; performing channel access to a certain channel based on an ASR back-off process; transmitting an srDATA frame from the certain channel to a second mobile terminal based on the ASR list; and receiving an srACK frame from the second mobile terminal in response to the srDATA frame, wherein the certain channel is a channel to/from which a third mobile terminal transmits and receives a data frame, the srDATA frame and data frame are transmitted from the certain channel at a certain point, and the ASR list is information on a mobile terminal that does not collide with the data frame when the first mobile terminal transmits the srDATA frame and receives the srACK frame.

14 Claims, 6 Drawing Sheets

(56) References Cited

U.S. PATENT DOCUMENTS

| | | | | |
|---|---|---|---|---|
| 2007/0259665 | A1* | 11/2007 | Chiu | H04L 1/1671 455/436 |
| 2009/0286481 | A1* | 11/2009 | Abraham | H04W 72/1231 455/63.1 |
| 2012/0099450 | A1 | 4/2012 | Madan et al. | |
| 2012/0099530 | A1* | 4/2012 | Morioka | H04W 72/046 370/328 |
| 2013/0058218 | A1* | 3/2013 | Wu | H04W 74/0816 370/241 |
| 2013/0083722 | A1* | 4/2013 | Bhargava | H04W 72/085 370/315 |
| 2013/0229996 | A1* | 9/2013 | Wang | H04W 72/0413 370/329 |
| 2014/0286203 | A1* | 9/2014 | Jindal | H04J 11/0026 370/278 |
| 2014/0328268 | A1* | 11/2014 | Zhu | H04W 74/002 370/329 |
| 2015/0327123 | A1* | 11/2015 | Szymanski | H04W 72/082 370/330 |
| 2015/0382342 | A1* | 12/2015 | Seok | H04W 74/0816 370/336 |
| 2016/0183304 | A1* | 6/2016 | Fischer | H04W 74/0816 370/278 |

OTHER PUBLICATIONS

Junghwi Jeon et al., "A Collision Compensation Method for Improving Saturation Throughput in Wireless LAN", The 15th Next Generation Communication Software(NCS 2011), Dec. 2011, pp. 1-8, Pyeongchang, Korea.

Yong-Tae Park et al., "Collision alleviation algorithm with Binomial Backoff retransmission method in CSMA/CA of Wireless VHF Communication", Collection of Dissertations of (Fall) 2003 of the Institute of Electronics and Information Engineers(IEIE), Nov. 2003, pp. 235-238, vol. 26, No. 2, Communications Society, Seoul, Korea.

* cited by examiner

METHOD AND APPARATUS FOR TRANSMITTING AND RECEIVING DATA BASED ON AGGRESSIVE SPATIAL REUSE

CROSS-REFERENCE TO RELATED APPLICATION

The present application claims priority to Korean patent application numbers 10-2014-0066090, filed on May 30, 2014 and 10-2014-0072035, filed on Jun. 13, 2014, the entire disclosure of which is incorporated herein in its entirety by reference.

BACKGROUND

Field of Invention

Various embodiments of the present invention relate to mobile communication, and more particularly, to a method and apparatus for transmitting and receiving data via a mobile channel.

Description of Related Art

Compared to the late 1990s when a wireless LAN card had to be inserted into a notebook to be used, nowadays, various smart apparatuses such as notebooks, PCs, smart phones, and smart pads are manufactured with a wireless LAN mounted thereon in the first place. Wireless LANs are being used in various apparatuses for various purposes, for example, internet can be accessed via a wireless LAN, and various services such as transmitting files and data between apparatuses, and high resolution video streaming are being used based on a wireless LAN in daily lives. Recently, usage of wireless LANs are being extended to areas that would have been unimaginable in the past such as keeping safety in homes, and contributing to reducing electricity costs for customers in connection with electricity companies by adjusting electronic devices not only in homes but also outside homes.

The IEEE 802.11ac standard enables gigabyte transmission rates in 5 GHz bands based on wireless LANs. Besides ultraspeed transmissions, various service scenarios have become possible using wireless LANs. Furthermore, standardization is actively in the way for the IEEE 802.11 ah and IEEE 802.11af technologies which use a frequency band of or less than 1 GHz, and which shares a frequency band for TVs thereby extending the wireless LAN coverage. Besides the aforementioned, standardizing the IEEE 802.11ai for reducing access time in congested areas is underway.

The IEEE 802.11af is a technology where a wireless LAN shares a TV idle band based on a database. It uses the IEEE 802.11ac PHY (physical layer) of 5 GHz by down clocking. The IEEE 802.11af is significantly influenced by frequency regulations regarding a TV idle band, and recently the US FCC announced a reverse auction regarding a TV idle band, and its results that will come out in 2015 which is being watched with keen interest.

The IEEE 802.11ah enables broadband wireless LAN services using the increase in radio coverage based on frequency band characteristics of or less than 1 GHz. Furthermore, it supports a plurality of low power sensors operating in power saving modes, and may be used in cellular offloading. Preamble and beacon signals have been designed to be suitable for such service application areas, and TIMs (Traffic Indication MAP) have also been designed to have layered structures.

The IEEE 802.11ai is a MAC technology for reducing wireless LAN access time. It reduces the access time under congested conditions by filtering a probe response in active scanning, and reduces the access time by designing new discovery frames and simplifying security levels.

SUMMARY

A first purpose of various embodiments of the present invention is to provide a method for transmitting mobile data based on an ASR (aggressive spatial reuse).

A second purpose of various embodiments of the present invention is to provide an apparatus for transmitting mobile data based on an ASR (aggressive spatial reuse).

According to an embodiment of the present invention, there is provided a mobile data transmission method of a first mobile terminal, the method including transmitting a dRTS (disruptive request to send) frame and creating an ASR (aggressive spatial reuse) list; performing channel access to a certain channel based on an ASR back-off process; transmitting an srDATA frame from the certain channel to a second mobile terminal based on the ASR list; and receiving an srACK (acknowledgement) frame from the second mobile terminal in response to the srDATA frame, wherein the certain channel may be a channel to/from which a third mobile terminal transmits and receives a data frame, the srDATA frame and data frame may be transmitted from the certain channel at a certain point, and the ASR list may be information on a mobile terminal that does not collide with the data frame when the first mobile terminal transmits the srDATA frame and receives the srACK frame. The ASR back-off process may include choosing a random number N(N is a natural number) from an ASR contention window and deciding an ASR back-off time; measuring a noise power as the ASR back-off time decreases; and performing the channel access when the noise power does not exceed a threshold value until the ASR back-off time decreases to 0. A first ending time of transmission of the srDATA frame and a second ending time of transmission of the data frame may be set to be the same, and the srDATA frame may include zero padded data when the second ending time of transmission is longer than the first ending time of transmission. Information on the second ending time of transmission may be obtained based on a duration field included in an RTS (request to send) frame that the third mobile terminal transmitted. When the first mobile terminal does not receive a response frame for or more than certain times from a certain mobile terminal that transmitted a frame, the ASR list may be updated by deleting the certain mobile terminal. The transmitting a dRTS frame and creating an ASR list by the first mobile terminal may include determining whether or not a collision occurred in a data frame being transmitted from another mobile terminal due to the dRTS frame; and including the another mobile terminal into the ASR list when it is determined that a collision did not occur in the data frame.

According to another embodiment of the present invention, there is provided a first mobile terminal that transmits mobile data, wherein the first mobile terminal comprises: an RF (radio frequency) unit that transmits and receives a mobile signal; and a processor that is selectively connected to the RF unit and operates, wherein the processor is configured to transmit a dRTS (disruptive request to send) frame and creates an ASR (aggressive spatial reuse) list, perform channel access to a certain channel based on an ASR back-off process, transmit an srDATA frame from the certain channel to a second mobile terminal based on the ASR list, and receive an srACK (acknowledgement) frame from the second mobile terminal in response to the srDATA frame, the certain channel being a channel through which a third mobile terminal transmits and receives a data frame, the srDATA frame and the data frame being transmitted from the certain channel at a certain point, and the ASR list being information on a mobile terminal that does not collide with the data frame when the first mobile terminal transmits the srDATA frame and receives the srACK frame. The ASR back-off process may choose a random number N(N is a natural number) from an ASR contention window and decides an ASR back-off time; measure a noise power as the ASR back-off time decreases; and perform the channel access when the noise power does not exceed a threshold value until the ASR back-off time decreases to 0. A first ending time of transmission of the srDATA frame and a second ending time of transmission of the data frame may be set to be the same, and the srDATA frame may include zero padded data when the second ending time of transmission is longer than the first ending time of transmission. Information on the second ending time of transmission may be obtained based on a duration field included in an RTS (request to send) frame that the third mobile terminal transmitted. Whe the first mobile terminal does not receive a response frame for or more than certain times from a certain mobile terminal that transmitted a frame, the ASR list may be updated by deleting the certain mobile terminal. The processor may be configured to determine whether or not a collision occurred in a data frame being transmitted from another mobile terminal due to the dRTS frame, and to include the another mobile terminal into the ASR list when it is determined that a collision did not occur in the data frame.

As aforementioned, by using a method and apparatus for transmitting mobile data based on an ASR according to embodiments of the present invention, it is possible to reuse spatial resources more actively than conventional wireless LANs, thereby increasing the data transmission efficiency in wireless LANS.

BRIEF DESCRIPTION OF THE DRAWINGS

The above and other features and advantages of the present invention will become more apparent to those of ordinary skill in the art by describing in detail embodiments with reference to the attached drawings in which.

DETAILED DESCRIPTION

Figure 1:
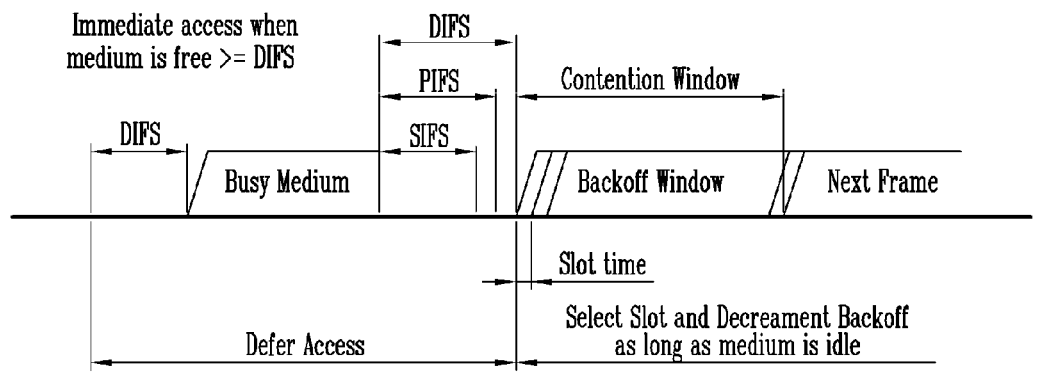
FIG. 1 is a conceptual view illustrating a channel access method of a STA based on a DCF.

Hereinafter, embodiments will be described in greater detail with reference to the accompanying drawings. Embodiments are described herein with reference to cross-sectional illustrates that are schematic illustrations of embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but may include deviations in shapes that result, for example, from manufacturing. In the drawings, lengths and sizes of layers and regions may be exaggerated for clarity. Like reference numerals in the drawings denote like elements.

Terms such as 'first', and 'second' may be used to describe various components, but they should not limit the various components. Those terms are only used for the purpose of differentiating a component from other components. For example, a first component may be referred to as a second component, and a second component may be referred to as a first component and so forth without departing from the spirit and scope of the present invention. Furthermore, 'and/or' may include any one of or a combination of the components mentioned.

Furthermore, 'connected/accessed' represents that one component is directly coupled to another component or indirectly coupled through another component. In this specification, a singular form may include a plural form as long as it is not specifically mentioned in a sentence.

In this specification, a singular form may include a plural form as long as it is not specifically mentioned in a sentence. Furthermore, 'include/comprise' or 'including/comprising' used in the specification represents that one or more components, steps, operations, and elements exist or are added.

Herein, an STA is a functional medium that includes a MAC (Medium Access Control) and a physical layer interface of the mobile medium that follows regulations of the IEEE (Institute of Electrical and Electronics Engineers) 802.11 standard. It may be construed to include both an AP (access point) and a non-AP STA (non-AP station).

The STA may be referred to as a mobile terminal, mobile device, WTRU (mobile transmit/receive unit), UE (user equipment), MS (mobile station), mobile subscriber unit or just a user.

FIG. 1 is a conceptual view illustrating a channel access method of an STA based on a DCF.

Generally, according to a channel access method based on a DCF (distributed coordination function), when a medium is not in use for or more than a DIFS (DCF inter frame space) period (that is, when the medium is idle when a channel is in a DIFS), an STA may transmit an MPDU (MAC protocol data unit) that is imminent for transmission. When the STA determines that the medium is in use by a carrier sensing mechanism, it may decide a size of a CW (contention window) by a random back-off algorithm and perform a back-off process. The STA sets a CW and chooses a timeslot in the CW to perform the back-off process. Herein, the chosen time slot is called a back-off time. Of a plurality of STAs that have chosen a back-off time, an STA that has chosen a relatively shorter back-off time may access the medium before an STA that chose a longer back-off time accesses the medium. The remaining STAs may stop the remaining back times, and wait until the STA that transmits a frame completes transmitting the frame. When the STA completes transmitting the frame, the remaining STAs may contend with the remaining back-off times and obtain the medium.

That is, in a case where an STA accesses a channel using a DCF, the STA may detect the state of the channel for a certain period of time. Specifically, when the channel is idle during a DIFS, the STA attempts transmission after a random back-off time. Such a DCF-based transmission method may prevent collision from occurring when a plurality of STAs transmit a frame at the same time.

A random back-off time is the time an STA waits until it transmits a frame after waiting for a certain period of time (for example, a DIFS). An STA may decide a CW based on a CWmin that is a minimum CW time and a CWmax that is a maximum CW time.

Figure 2:
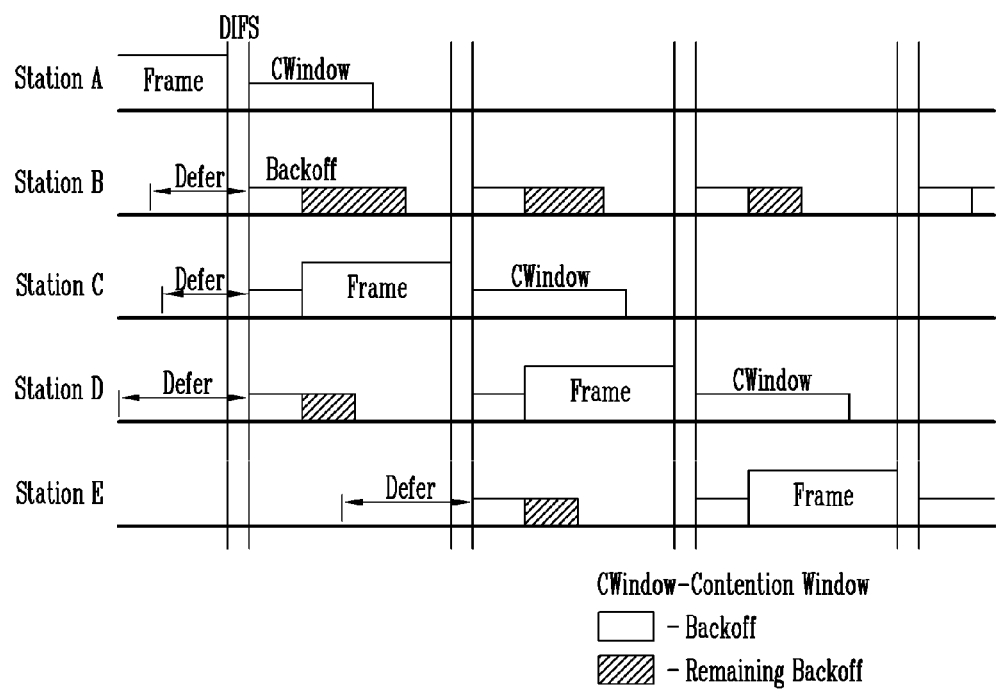
FIG. 2 is a conceptual view illustrating a back-off process of a plurality of STAs.

FIG. 2 is a conceptual view illustrating a back-off process of a plurality of STAs.

Referring to FIG. 2, a back-off slot may occur after it is determined that the medium is idle during a DIFS period. When an activity of the medium is not sensed after the DIFS period, an STA may reduce a back-off time based on a SlotTime. When it is determined that the medium is in use during the back-off slot time, the STA may not reduce the back-off time. Frame transmission by the STA may be performed until a back-off timer that has been set becomes 0.

Furthermore, in a DCF transmission method, an RTS/CTS access mode may be used where, before a data frame is transmitted, the data frame is exchanged to a control frame ((RTS (request to send) frame, CTS (clear to send) frame)) to occupy a channel in advance. Such a method may reduce channel waste by replacing the collision that may occur when transmitting data frames with a collision of relatively short control frames.

A MAC layer may use a PCF (point coordination function) as another method for a plurality of STAs to share a mobile medium. The aforementioned DCF is based on a CSMA (carrier sense multiple access)/CA (collision avoid) method, and is thus unable to guarantee real time transmission of data between STAs and AT. On the other hand, the PCF is a transmission method that is based on non-contention, that may be used to guarantee QoS (quality of service) when transmitting data real time. The PCF, which is also called a non-contention transmission service, does not use the entire transmission period of a medium but may use it alternatively with the contention-based service of the DCF method. In the PCF, a point coordinator configured in an AP of a BSS may use a polling method to control the authority of each STA for occupying the medium. It may give priority to a PIFS that is an IFS (inter-frame space) inside the PCF in transmitting a frame by setting the PIFS to a smaller value than a DIFS that is an IFS of the DCF. The IFS denotes a space between frames, which may be used to set an order of priority for STAs to access the medium. Specifically, the IFS may be defined as follows.

Figure 3:
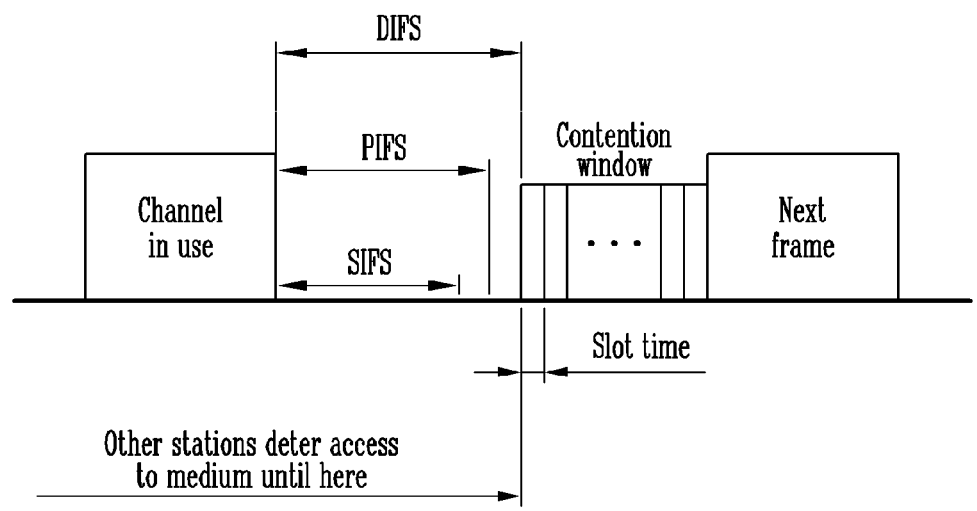
FIG. 3 is a conceptual view illustrating an IFS (inter frame space) between frames.

FIG. 3 is a conceptual view illustrating an IFS (inter frame space) between frames.

Referring to FIG. 3, a space between two frames may be an IFS. An STA may determine whether or not a channel is in use for a predetermined IFS time section using a carrier wave sensing method. A MAC layer that uses DCF defines various IFSs. The order of priority of STAs for occupying a mobile medium may be determined by the IFSs. The spaces between frames according to IFS types are as follows:

(1) SIFS (short inter frame symbol): used when transmitting an RTS/CTS, or ACK frame. First priority.

(2) PIFS (PCF IFS): used when transmitting a PCF frame (3) DIFS (DCF FIS): used when transmitting a DCF frame (4) EIFS (extended IFS): used only when a frame transmission error occurs. Not a fixed space.

In the case of using only a DCF as a method for a plurality of STAs to share a mobile medium in a MAC layer, various problems may occur. For example, in the case of using a DCF, when the plurality of STAs attempt initial access to an AP at the same time, much collision occurs between the plurality of STAs. Furthermore, in a DCF, there is no concept regarding the order of priority, and thus the QoS (quality of service) of traffic data transmitted from the STAs cannot be guaranteed. In order to resolve these problems, in the 802.11e, an HCF (hybrid coordination function) that is a new coordination function was defined and the channel access performance of the DCF and HCF improved. In the HCF, a HCCA (HCF controlled channel access) and EDCA (enhanced distributed channel access) are defined that are two channel accessing methods similar to what was defined in the MAC. In the EDCA and HCCA, traffic categories which are the order of priority of transmission are defined, and based on these traffic categories, the order of priority of performing access to a channel may be determined. That is, by defining a CW and IFS according to the category of traffic data being transmitted from an STA, it is possible to determine the order of priority of accessing a channel according to the type of traffic data.

For example, in the case where the traffic data is an email, the data may be allocated to a low priority class. By way of another example, in the case where the traffic data is voice communication via a wireless LAN, since it is data that needs to be transmitted real time, the traffic data may be allocated to a high priority class and a channel access may be performed.

In the case of using an EDCA, traffic data having a high priority class may have more opportunities to be transmitted than traffic data having a low priority class. Furthermore, on average, an STA having a high priority class traffic may have a shorter waiting time than an STA having a low priority class traffic before transmitting a packet. In the EDCA, an order of priority of transmission may be embodied by allocating a shorter CW to high priority class traffic than low priority class traffic, and by allocating an AIFS (arbitration inter-frame space) that is an IFS which is shorter than the IFS which is an inter-frame space defined in the DCF. Furthermore, the EDCA may enable STAs to access the medium without contention for a channel during a period called a TXOP (Transmit Opportunity). STAs may transmit as much packets as possible during a TXOP period predetermined within a range of maximum period. If one frame is too long and thus cannot be transmitted during one TXOP, the frame may be cut into small frames and be transmitted. Using the TXOP may reduce situations of a STA having a low transmission rate excessively occupying a channel which has been a problem of the existing 802.11 DCF MAC.

In a conventional wireless LAN based on the IEEE 802.11, since numerous STAs or APs transmit data competitively, collision of data may occur. In order to prevent this, an STA that wish to transmit data checks whether or not other STAs are using a certain channel, and only when it is confirmed that no one is using the channel, transmits a frame and thus evades collision between frames, thereby guaranteeing a safe transmission of frames.

However, since STAs are spaced from one another by a certain distance, even when a frame is transmitted and received between a different AP and STA at the same time, data may be received in a normal manner without causing collision between frames. In the case of utilizing a case where collision does not occur between frames, it is possible to increase the entire data transmission efficiency in a wireless LAN.

According to an embodiment of the present invention, while a different node (STA or AP) occupies a certain channel to transmit a frame, it may be checked whether or not there is collision of frames, and a frame may be transmitted. Since a node currently transmitting and receiving a frame is spaced from another node, it is possible to check a case that does not cause collision with a frame transmitted and received by another node even when a frame is transmitted. Using such a frame transmission method, it is possible to increase the entirety of data transmission efficiency in the wireless LAN.

For example, in order to actively reuse space, it is possible to use a case which STA artificially cause collision when transmitting data and where an artificial collision does not cause data transmission.

According to an embodiment of the present invention, unlike in a conventional wireless LAN, it is possible to have a certain STA and/or another STA adjacent to a certain AP and another AP transmit and receive data from a same channel at the same time. Hereinbelow, operations of an AP and STA will be differentiated, but as aforementioned, an STA may be used to include both an AP (access point) and non-AP STA (Non-AP Station). For example, in the case of a wifi-direct, all STAs may be construed as being non-AP STAs. That is, hereinbelow, all STAs disclosed in embodiments of the present invention may be either an AP (access point) or non-AP STA.

Figure 4A:
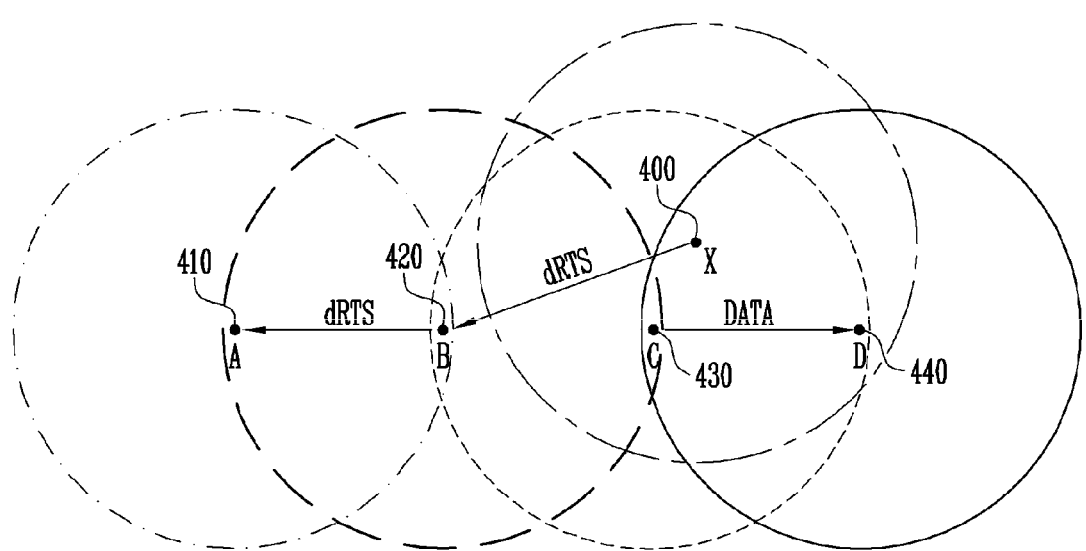
FIGS. 4a, 4b, and 4c are conceptual views illustrating a mobile data transmission method according to an embodiment of the present invention.
Figure 4B:
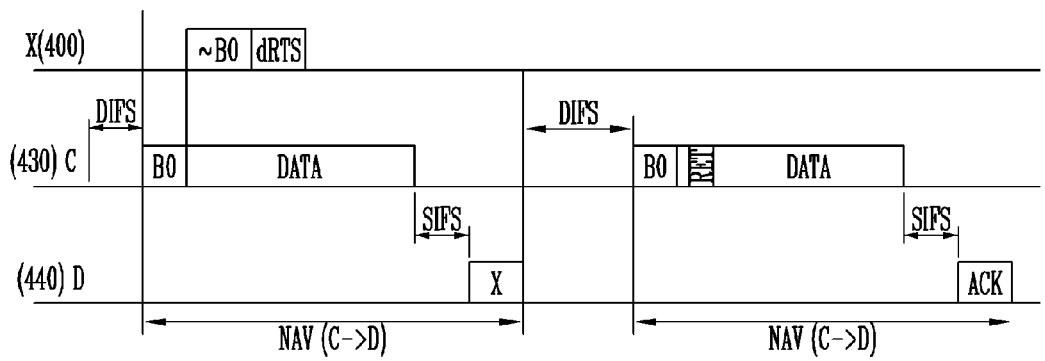
Figure 4C:
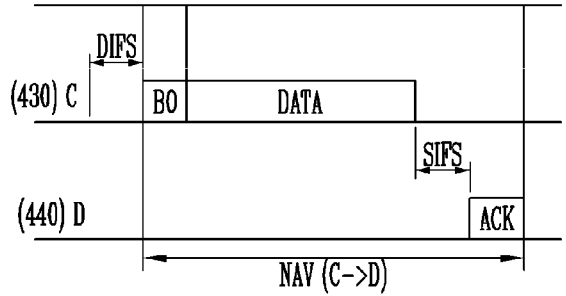

FIGS. 4a, 4b and 4c are conceptual views illustrating a method for transmitting and receiving a frame according to an embodiment of the present invention;

FIG. 4a illustrates locations of STA A 410, STA B 420, STA C 430, STA D 440, and STA X 400. Hereinbelow, a method will be explained for transmitting and receiving data wherein a certain STA determines whether or not there will be collision of data and transmits and receives data through a same channel even when data is being transmitted and received between other STAs according a location of the certain STA.

Referring to FIG. 4b, a case where STA X 400 transmits a dRTS (request to send) frame while STA C 430 transmits and receives data to and from STA D 440 will be explained. As such, a frame that STA X 400 transmits in order to determine whether or not collision occurs for a data frame while STA C 430 transmits and receives a data frame to and from STA D 440 may be called a dRTS (Disruptive RTS) frame (or prodding RTS frame).

A dRTS frame that STA X 400 transmitted may collide with a data frame that STA C 430 transmits. Due to this collision, STA C 430 may not receive an ACK frame from STA D 440 in response to a data frame.

When an ACK in response to a data frame transmitted is not received, STA C 430 may retransmit a data frame. A MAC header of the data frame retransmitted may set an RET field. STA X 400 may identify the situation that an ACK that should have been transmitted has not been transmitted, and may not transmit a dRTS frame when STA C 430 retransmits a data frame. In response to the data frame that STA C 430 retransmitted, STA D 440 may transmit an ACK to STA C 430. Based on such a process, STA S 400 may determine that it is impossible to transmit and receive data based on ASR.

FIG. 4c illustrates a case where a dRTS frame that STA B 420 transmitted does not collide with a data frame that STA C 430 transmitted. In such a case, STA D 440 may transmit an ACK frame in response to a data frame received from STA 430. That is, when an STA is spaced from another STA by or more than a certain distance, the effect of a dRTS frame is trivial, and thus the data frame that STA C 430 transmitted may be received without breaking. Unlike the case of STA X 400, STA D 440 may transmit an ACK to STA C 430 after a SIFS. When STA D 440 receives the ACK that STA D 440 transmitted or confirms that STA C 430 did not retransmit a data frame, it may determine that it is in an area where it is possible to transmit and receive data based on an ASR. Hereinbelow, an embodiment of the present invention will be explained assuming that an ACK frame and not a NACK frame is received in response to a data frame, for convenience of explanation.

As such, an STA or AP that wishes to perform an ASR may determine whether or not it is possible to perform an ASR based on a relationship with an AP and/or STA nearby. For example, an STA that wishes to perform an ASR may create an ASR list where an ASR strategy may be applied based on a relationship with an AP and/or STA nearby. The ASR list may include information on an STA and/or AP for an STA to perform an ASR. A method for creating the ASR list will be explained hereinafter.

Figure 5:
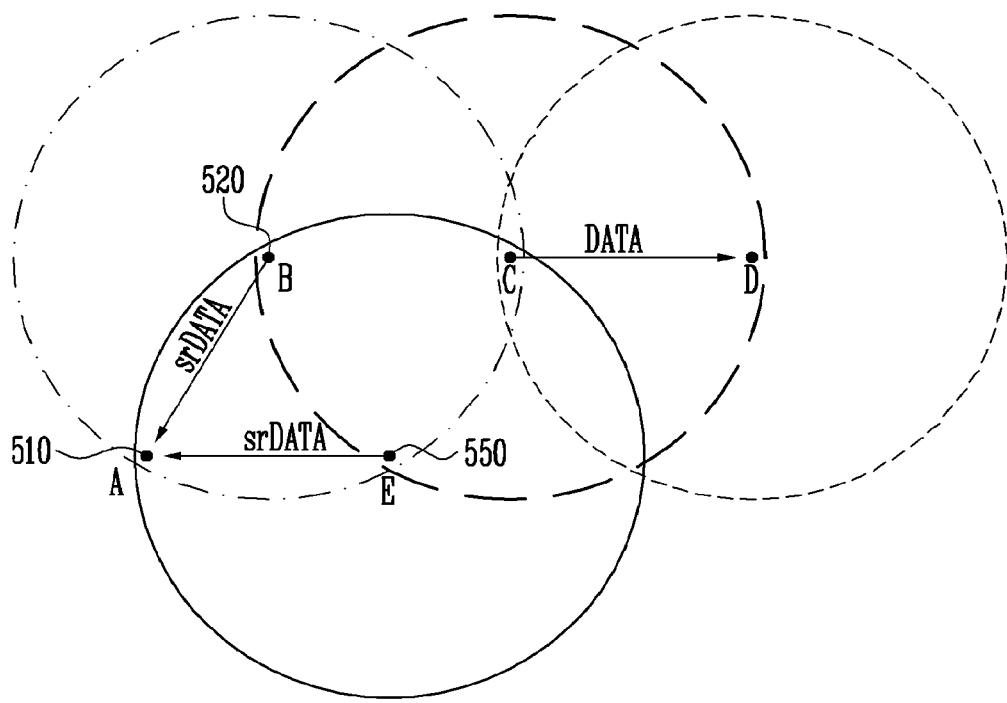
FIG. 5 is a conceptual view illustrating an ASR method according to an embodiment of the present invention.

FIG. 5 is a conceptual view illustrating a channel Busy Back-off according to an embodiment of the present invention.

FIG. 5 illustrates a case where both STA B 520 and STA E 550 may use an ASR and wish to transmit an srDATA frame. The term srDATA may be used to differentiate a data frame being transmitted and received based on an ASR method from a conventional data frame.

FIG. 5 assumes a case where it is possible for both STA B 520 and STA E 550 to use an ASR and thus wish to transmit an srDATA frame to STA A 510 at the same time. As aforementioned, STA A 510 may be construed as being an AP. In such a case, collision may occur between srDATA frames that STA B 520 and STA E 550 transmit.

That is, when a collision occurs between a first srDATA frame that STA B 520 transmits to STA A 510 and a second srDATA frame that STA E 550 transmits to STA A 510, STA A 510 may not receive the first srDATA frame and the second srDATA frame.

In order to prevent such collision between srDATA frames, it is possible to enable obtaining channel resources based on a back-off process when transmitting a frame based on an ASR.

Even when transmitting a frame based on an ASR, the back-off process may be performed differently from a conventional back-off process.

A conventional random back-off process operates when a channel is idle, but an ASR based back-off process according to an embodiment of the present invention may operate even when a channel is busy.

An ASR based back-off process may be performed through the following procedure. From an STA point of view, in order to perform an ASR based back-off process, an STA randomly chooses a number N from ASR-contention window numbers. In the ASR based back-off process, an ASR contention window may be defined as the contention window, and a random number N may be chosen from a corresponding contention window to determine an ASR back-off time.

Information on a current Pn (noise power) is stored.

An ASR back-off time may decrease without considering the state of a channel, and as the ASR back-off time decreases, information on the current noise power may be updated.

If a current noise power measured exceeds a certain threshold value as an ASR back-off time decreases, it may be regarded that another STA won in an ASR based back-off contention and thus the another STA is transmitting an ASR based frame, and thus the STA may not transmit an ASR frame.

On the contrary, if a current noise power measured when an ASR back-off time decreases to 0 and an ASR back-off time becomes 0 does not exceed a certain threshold value, the STA may transmit an ASR frame.

That is, according to an embodiment of the present invention, when a frame is sensed to be transmitted from another STA or AP in a channel where the STA operates, it is possible determine whether or not to transmit an ASR frame based on whether or not a noise power is or above a certain value.

TABLE 1

Algorithm 1 ASR-Random Backoff algorithm

| | |
|---|---|
| 1: | Choose random number (N) in SR-Window |
| 2: | Store a currently noise power (Pn) |
| 3: | while N > 0 do |
| 4: |    Regardless of channel condition. N decrease in every slot and update Pn |
| 5: |    if Pn exceeds a certain threshold (Pth) then |
| 6: |       fail to transmit |
| 7: |    end if |
| 8: |    if N equals to Zero without exceeding Pth Then |
| 9: |       win to transmit |
| 10: |    end if |
| 11: | end while |

Such an ASR based back-off process may be used to transmit an ASR frame (for example, srDATA frame and dRTS frame).

Figure 6:
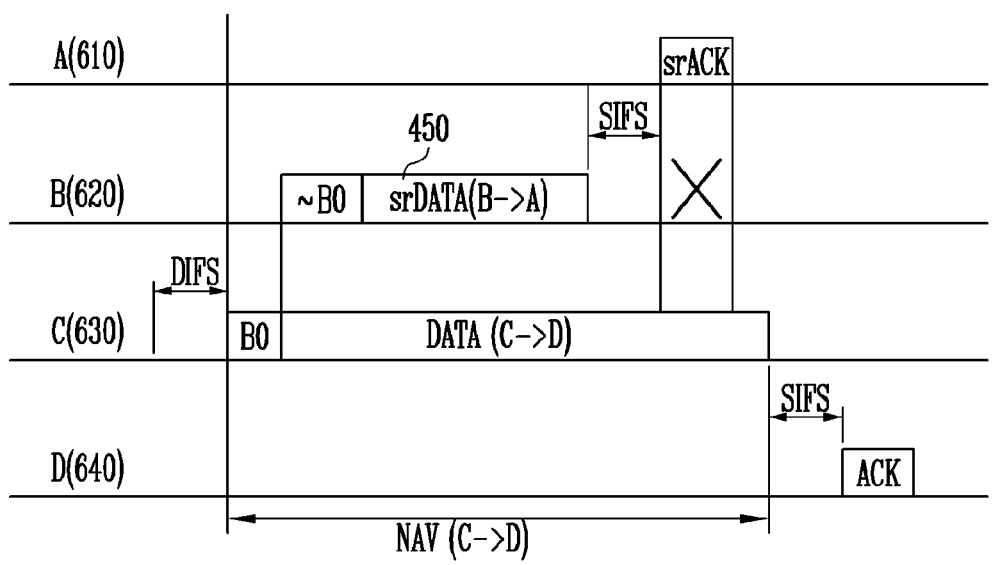
FIG. 6 is a conceptual view illustrating a method for transmitting mobile data based on ASR according to an embodiment of the present invention.

FIG. 6 is a conceptual view illustrating a method for transmitting and receiving data based on an ASR according to an embodiment of the present invention.

Referring to FIG. 6, while STA C 630 is transmitting a data frame to STA D 640, STA B 620 may transmit an srDATA frame to STA A 610. STA B 620 and STA C 630 may be construed as being APs.

Through the aforementioned ASR based back-off process, STA B 620 may access a channel at the same time through which STA C 430 and STA D 640 transmits and receives a frame. STA B 620 may perform an ASR and transmit an srDATA frame to STA A 610 without causing collision with a data frame that STA C 630 transmits.

In such a case, STA A 610 responds to an srACK frame in response to an srDATA frame that STA B 620 transmitted, in which case the srACK frame may collide with a data frame that another AP and/or STA transmits in a corresponding channel.

For example, STA B 620 may transmit an srDATA frame to STA A 610 while STA C 630 transmits a data frame to STA D 640. The time for which STA B 620 transmits the srDATA frame may be relatively shorter than the time for which STA C 630 transmits a data frame to STA D 640. In such a case, the srACK that STA A 610 transmits to STA B 620 may collide with the data frame that STA C 630 transmits. Herein, STA B 620 cannot receive the srACK transmitted from STA A 610. In order to resolve this problem, STA B 620 should be able to adjust the size of the srDATA frame in accordance with the size of the data frame that STA C 630 transmits.

Therefore, according to an embodiment of the present invention, in order to resolve the aforementioned problem, the time STA C 630 ends transmission of a data frame and the time STA B 620 ends transmission of a data frame may be set to be the same.

Figure 7:
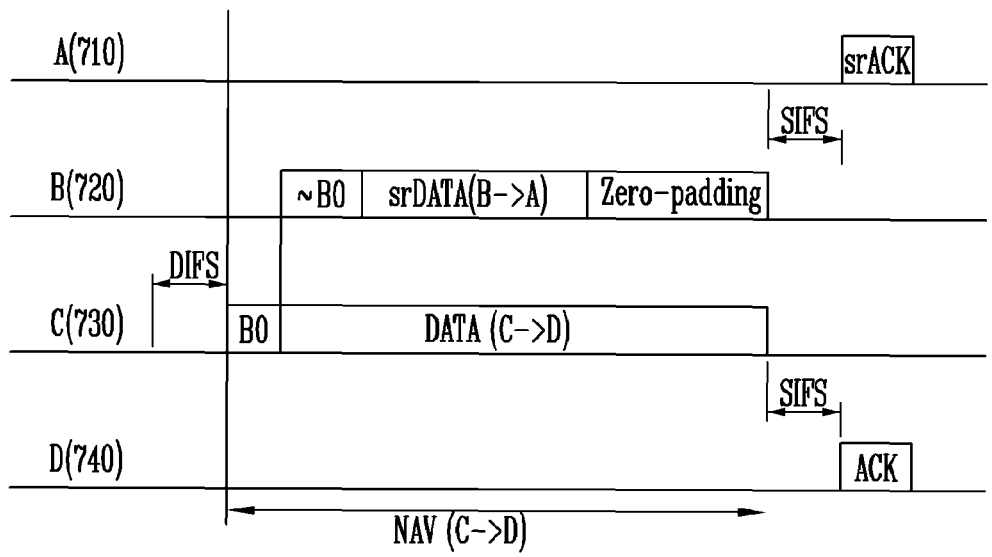
FIG. 7 is a conceptual view illustrating a method for transmitting mobile data based on ASR according to an embodiment of the present invention.

FIG. 7 is a conceptual view illustrating a method for transmitting and receiving data based on an ASR according to an embodiment of the present invention.

FIG. 7 illustrates a method for setting the time an STA and/or AP ends transmission of an srDATA frame and the time another STA and/or AP ends transmission of a data frame to be the same.

Referring to FIG. 7, it is possible to set a second ending time STA B 720 ends transmission of a srDATA frame and a second ending time STA C 730 ends transmission of a data frame to be the same.

In order to set the second ending time to be the same as a first ending time, STA B 720 may set the size of an srDATA frame that it transmits and the size of a data frame that STA B 720 transmits to be the same. For example, STA B 720 may take into account a modulating and coding method and set the time STA B 720 transmits an ASR frame such that the ending time of transmission of data frame is the same as the ending time of transmission of ASR data. Using this method, when STA A 710 transmits an srACK frame in response to an srDATA frame, it is possible to prevent collision with a frame that another AP and/or STA transmits.

Otherwise, in order to make the ending time of transmission of data frame to be the same as the ending time of transmission of an srDATA frame, STA B 720 may obtain information on the ending time of transmission of data frame of STA C 730 based on a duration field of an RTS frame that STA C 730 transmits before transmitting a data frame before transmission of data frame by STA C 730. Based on the ending time of transmission of data frame of STA C 730, STA B 720 may set the ending time of transmission of srDATA frame to be the same. For example, an srDATA frame may perform a zero padding in order to set the ending time of transmission to be the same. For example, the zero padding (or null padding) may be embodied in a MAC layer, and in an A-MPDU (aggregated MAC protocol data unit) form.

When this method is used, an srACK frame that STA A 710 transmits may not collide with a data frame that STA C 730 transmits in terms of time. When an srACK frame collides with a data frame that STA C 730 transmits in terms of time, interference may occur between them, causing error in data receiving. Therefore, using this method, STA B 720 may receive an srACK frame from STA A 710 without interference of data frame.

However, even when STA A 710 transmits an srACK frame in this method, the srACK frame may collide with an ACK frame that another STA or AP (for example, STA D 740) transmits.

Figure 8:
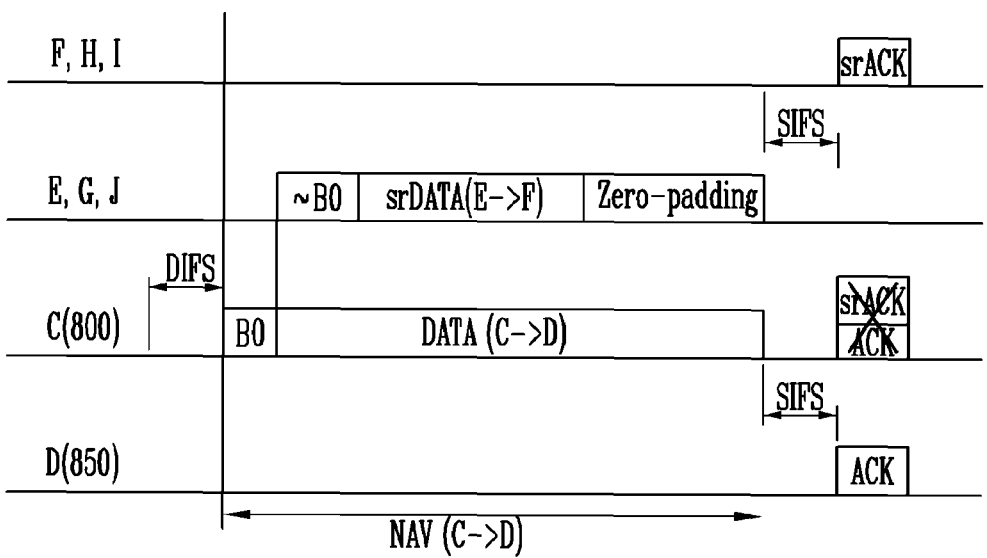
FIG. 8 is a conceptual view illustrating a method for transmitting mobile data based on ASR according to an embodiment of the present invention.

FIG. 8 is a conceptual view illustrating a method for transmitting and receiving data based on an ASR according to an embodiment of the present invention.

FIG. 8 illustrates a case where an ACK frame that a second STA transmits collides with an ACK frame that another STA or AP transmits even when the second STA transmits an srACK frame based on the method mentioned with reference to FIG. 7. When an ACK frame that the second STA transmits collides with an ACK frame that another STA or AP transmits, the ASR process may be stopped depending on certain determination.

FIG. 8 illustrates a case where a plurality of STAs, that is STA E, STA G, and STA J wish to transmit a frame based on an ASR to STA F, STA H, and STA I, respectively, with STA C 800 and STA D 850 communicating with each other. STA A to STa I illustrated in FIG. 8 may be assumed as the STAs located in the locations illustrated in FIG. 9.

STA C 800 may transmit and receive a frame to and from STA D 850. In this situation, assuming a case where at least one of STA E, STA G and STA J performs an ASR based random back-off process to transmit an srDATA frame to at least one of STA F, STA H, and STA I, the srDATA may perform a zero padding as aforementioned and set the ending time of transmission of data frame that STA C 800 transmits and the ending time of transmission of srDATA frame to be the same.

In the case of transmitting an srDATA, in response thereto, at least one of STA F, STA H and STA I may transmit an srACK frame. Such an srACK frame may collide with an ACK frame that STA D 810 transmits.

In order to prevent such a case, an STA and/or AP may determine whether or not to perform an ASR process based on the ASR list.

Figure 9:
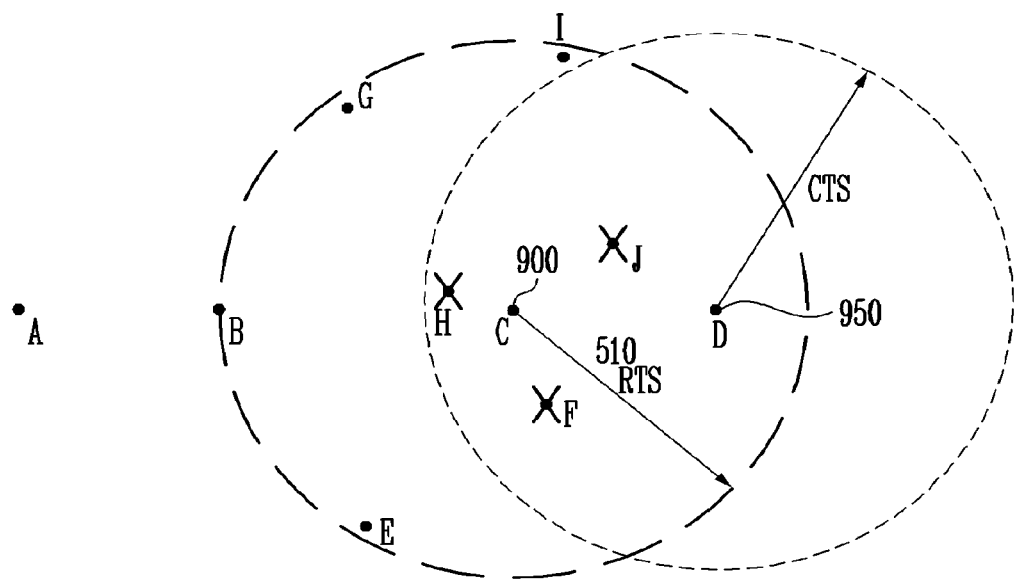
FIG. 9 is a conceptual view illustrating a method for creating an ASR list according to an embodiment of the present invention.

FIG. 9 is a conceptual view illustrating a method for creating an ASR list according to an embodiment of the present invention.

Referring to FIG. 9, when it is not possible to receive an srACK frame in response to an SRDATA frame in order to prevent collision of frames when performing an ASR, a process for transmitting and receiving data based on an ASR may not be performed.

Hereinbelow, for convenience of explanation, it is assumed that an AP transmits a dRTS, but an STA may transmit a dRTS frame instead. Furthermore, in FIG. 9, it is assumed that node H, node J, node F, node E, node G, and node I are STAs, but as aforementioned, a certain STA may be construed as an AP.

First of all, STA C 900 that wishes to perform an ASR may transmit a dRTS frame. In response to the dRTS frame, STA D 950 may transmit a dCTS frame.

In such a case, other STAs and/or APs located nearby TA C 900 and STA D 950 may receive a dRTS frame and/or a dCTS frame. For example, STA(H), STA(J), and STA(F) that are near STA C 900 and STa D 950 may receive a dRTS frame and dCTS frame. In such a case, an srACK frame may not be transmitted even when an srDATA frame is received from at least one of STA H, STA J, STA F, STA E, STA G and STA I. That is, an AP or STA that is located within a transmission coverage of STA C 900 and STA D 950 and receives dCTS frame while STA C 900 and STA D 950 perform ASR may not perform the process for transmitting and receiving data based on an ASR.

Furthermore, an STA or AP that is not located within a transmission coverage of STA C 900 and STA D 950 and thus does not receive a dRTS frame or dCTS frame may also determine whether or not an srACK response frame has been received in response to an srDATA and may not perform the process of transmitting and receiving data based on an ASR.

For example, one of STA E, STA G and STA I may transmit an srDATA frame to STA H, STA J, and STA F. It is possible to determine whether or not an srACK frame has been received in response to an srDATA frame after a certain time (SIFS) since transmitting the srDATA frame.

There may be a case where an srACK frame has not been received in response to an srDATA frame after a certain time (SIFS) since transmitting an ASR data frame. That is because, as aforementioned, STA H, STA J, and STA F have already been made not to respond to an srDATA frame of STA E, STA G and STA I. In such a case, an STA may increase the size of an ASR contention window that is used to perform an ASR back-off process. By increasing the size of an ASR contention window, it is possible to make an ASR back-off contention unfavorable, thereby increasing the possibility that data transmission of another AP or STA may end when transmitting an ASR data frame.

After increasing the size of an ASR contention window, it is possible to retransmit an srDATA frame. If an STA fails retransmitting an srDATA frame for or more than certain times, the STA that receives the srDATA frame may be deleted from the ASR list. For example, as aforementioned, in the case where STA H, STA J, and STA F are STAs that receive a dRTS frame and dCTS frame but do not transmit an srACK frame in response to an srDATA frame, STA H, STA J, and STA F may be deleted from the ASR list.

Figure 10:
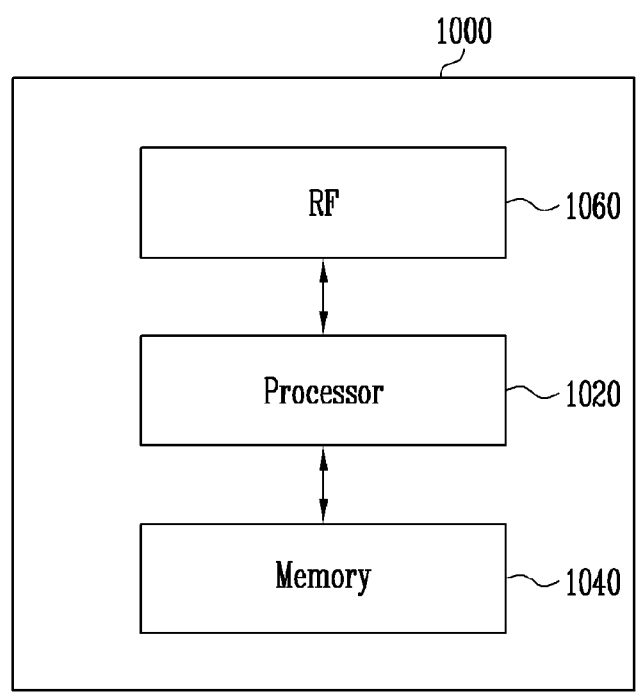
FIG. 10 is a block diagram illustrating a mobile terminal to which an embodiment of the present invention may be applied.

FIG. 10 is a block diagram illustrating a mobile terminal to which an embodiment of the present invention may be applied.

Referring to FIG. 10, the mobile terminal 1000 is an STA capable of embodying the aforementioned embodiments. The mobile terminal 1000 may be an AP or non-AT station.

The mobile terminal 1000 includes a processor 1020, memory 1040, and RF unit (radio frequency unit, 1060).

The RF unit 1060 may be connected to the processor 1020 and transmit/receive a mobile signal.

The processor 1020 embodies functions, processes and/or methods proposed in the embodiments of the present invention. For example, the processor 1020 may be embodied to perform operations of a mobile terminal according to the aforementioned embodiments of the present invention.

For example, when the mobile terminal is an AP, it may be embodied to transmit a dRTS frame or dCTS frame by an ASR back-off process, and manage an ASR list.

Furthermore, when the mobile terminal is an STA, the processor 1020 may just as well be embodied to transmit a dRTS frame or dCTS frame by an ASR back-off process and manage an ASR list.

The processor 1020 may include an ASIC (application-specific integrated circuit), another chip set, logic circuit, data process apparatus and/or a converter that mutually converts a base band signal and mobile signal. The memory 1040 may include ROM (read-only memory), RAM (random access memory), flash memory, memory card, storage medium and/or other storage apparatus. The RF unit 1060 may include one or more antenna that transmit and/or receive a mobile signal.

When the aforementioned embodiments are embodied in a software, the aforementioned method may be embodied in a module (process, function etc.) that performs the aforementioned functions. The module may be stored in the memory 1040 and be executed by the processor 1020. The memory 1040 may be inside or outside the processor 1020, and may be connected to the processor 1020 by various well known means.

In the drawings and specification, there have been disclosed typical exemplary embodiments of the invention, and although specific terms are employed, they are used in a generic and descriptive sense only and not for purposes of limitation. As for the scope of the invention, it is to be set forth in the following claims. Therefore, it will be understood by those of ordinary skill in the art that various changes in form and details may be made therein without departing from the spirit and scope of the present invention as defined by the following claims.

What is claimed is:

1. A mobile data transmission method of a first mobile terminal, the method comprising:
    transmitting a first disruptive request to send (dRTS) frame through a certain channel in order to disrupt data transmission between a third mobile terminal and a fourth mobile terminal while a data frame is transmitted through the certain channel between the third mobile terminal and the fourth mobile terminal;
    creating an aggressive spatial reuse (ASR) list that includes information on a second mobile terminal when it is determined that a collision does not occur in the data frame;
    performing channel access to the certain channel based on an ASR back-off process, which is performed when the certain channel is busy;
    transmitting a spatial reuse data (srDATA) frame through the certain channel to the second mobile terminal based on the ASR list; and
    receiving a spatial reuse acknowledgement (srACK) frame for the srDATA frame from the second mobile terminal, depending on whether or not the second mobile terminal receives a second dRTS frame of a fifth mobile terminal communicating with a sixth mobile terminal, and
    wherein when the second mobile terminal receives the second dRTS frame, the second mobile terminal does not transmit the srACK frame for the srDATA frame to the first mobile terminal.

2. The method according to claim 1,
    wherein the method further comprises:
    choosing a random number N (N is a natural number) from an ASR contention window and deciding an ASR back-off time;
    measuring a noise power as the ASR back-off time decreases; and
    performing the channel access when the noise power does not exceed a threshold value until the ASR back-off time decreases to 0.

3. The method according to claim 1,
    wherein a first ending time at which transmission of the srDATA frame ends and a second ending time at which transmission of the data frame ends are set to be the same, and
    wherein the srDATA frame comprises zero padded data when the second ending time is longer than the first ending time.

4. The method according to claim 3,
    wherein information on the second ending time is obtained based on a duration field included in a request to send (RTS) frame that the third mobile terminal transmitted.

5. The method according to claim 1,
    wherein when the first mobile terminal does not receive a response frame from a certain mobile terminal after the first mobile terminal repeatedly transmitted a frame to the certain mobile terminal a predetermined number of times, the ASR list is updated by deleting information on the certain mobile terminal when the ASR list includes the information on the certain mobile terminal.

6. The method according to claim 1,
    wherein the transmitting a first dRTS frame and creating an ASR list by the first mobile terminal comprises:
    determining whether or not a collision occurred in a data frame being transmitted from another mobile terminal due to the first dRTS frame; and
    including the another mobile terminal into the ASR list when it is determined that a collision does not occur in the data frame.

7. The method according to claim 1, wherein whether the collision occurs or not is determined by checking whether the third mobile terminal receives an acknowledgement (ACK) frame from the fourth mobile terminal, or whether the third mobile terminal retransmits the data frame to the fourth mobile terminal, or both.

8. A first mobile terminal that transmits mobile data,
    wherein the first mobile terminal comprises:
    a radio frequency (RF) unit that transmits and receives a mobile signal; and
    a processor that is selectively connected to the RF unit and operates,
    wherein the processor is configured to:
        transmit a first disruptive request to send (dRTS) frame through a certain channel in order to disrupt data transmission between a third mobile terminal and a fourth mobile terminal while a data frame is transmitted through the certain channel between the third mobile terminal and the fourth mobile terminal;
        create an aggressive spatial reuse (ASR) list that includes information on a second mobile terminal when it is determined that a collision does not occur in the data frame,
        perform channel access to the certain channel based on an ASR back-off process, which is performed when the certain channel is busy,
        transmit a spatial reuse data (srDATA) frame through the certain channel to the second mobile terminal based on the ASR list, and
        receive a spatial reuse acknowledgement (srACK) frame for the srDATA frame from the second mobile terminal, depending on whether or not the second mobile terminal receives a second dRTS frame of a fifth terminal communicating with a sixth mobile terminal, and
    wherein when the second mobile terminal receives the second dRTS frame, the second mobile terminal does not transmit the srACK frame for the srDATA frame to the first mobile terminal.

9. The first mobile terminal according to claim 8,
    wherein the processor is configured to choose a random number N (N is a natural number) from an ASR contention window and decide an ASR back-off time,
    measure a noise power as the ASR back-off time decreases, and
    perform the channel access when the noise power does not exceed a threshold value until the ASR back-off time decreases to 0.

10. The first mobile terminal according to claim 8,
    wherein a first ending time at which transmission of the srDATA frame ends and a second ending time at which transmission of the data frame ends are set to be the same, and
    wherein the srDATA frame comprises zero padded data when the second ending time is longer than the first ending time.

11. The first mobile terminal according to claim 10,
    wherein information on the second ending time is obtained based on a duration field included in a request to send (RTS) frame that the third mobile terminal transmitted.

12. The first mobile terminal according to claim 8,
    wherein when the first mobile terminal does not receive a response frame from a certain mobile terminal after the first mobile terminal repeatedly transmitted a frame to the certain mobile terminal a predetermined number of times, the ASR list is updated by deleting the certain mobile terminal when the ASR list includes the information on the certain mobile terminal.

13. The first mobile terminal according to claim 8, wherein the processor is configured to determine whether or not a collision occurred in a data frame transmitted from another mobile terminal due to the first dRTS frame, and wherein the processor includes the another mobile terminal into the ASR list when it is determined that a collision does not occur in the data frame.

14. The first mobile terminal according to claim 8, wherein whether the collision occurs or not is determined by checking whether the third mobile terminal receives an acknowledgement (ACK) frame from the fourth mobile terminal, or whether the third mobile terminal retransmits the data frame to the fourth mobile terminal, or both.

* * * * *